(12) United States Patent
Yamada (10) Patent No.: US 11,646,865 B2
(45) Date of Patent: May 9, 2023

(54) TRANSMISSION DEVICE

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventor: Yuta Yamada, Fuchu (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 147 days.

(21) Appl. No.: 17/428,078

(22) PCT Filed: Mar. 13, 2020

(86) PCT No.: PCT/JP2020/011288
§ 371 (c)(1),
(2) Date: Aug. 3, 2021

(87) PCT Pub. No.: WO2020/189587
PCT Pub. Date: Sep. 24, 2020

(65) Prior Publication Data
US 2022/0140992 A1    May 5, 2022

(30) Foreign Application Priority Data
Mar. 15, 2019    (JP) .............................. JP2019-048781

(51) Int. Cl.
*H04L 7/08* (2006.01)
*H04L 12/417* (2006.01)

(52) U.S. Cl.
CPC .............. *H04L 7/08* (2013.01); *H04L 12/417* (2013.01)

(58) Field of Classification Search
CPC ................................ H04L 7/08; H04L 12/417
See application file for complete search history.

(56) References Cited

U.S. PATENT DOCUMENTS

| | | | |
|---|---|---|---|
| 6,711,131 B1 | 3/2004 | Shiobara | |
| 2012/0224492 A1* | 9/2012 | Kitayama | ............. H04L 12/403 370/242 |
| 2018/0076973 A1 | 3/2018 | Yoshikawa et al. | |

FOREIGN PATENT DOCUMENTS

| | | | |
|---|---|---|---|
| JP | 2000-92089 A | 3/2000 | |
| JP | 3289416 B2 * | 6/2002 | |

(Continued)

OTHER PUBLICATIONS

International Search Report dated May 26, 2020 in PCT/JP2020/011288 filed on Mar. 13, 2020, 2 pages.

*Primary Examiner* — Duc C Ho
(74) *Attorney, Agent, or Firm* — Maier & Maier, PLLC (57) ABSTRACT

A transmission device includes a current transmission right as a node constituting an implicit token-passing network. When receiving a synchronization frame including a synchronization node number for specifying a synchronization node and network live node map information, which is information on nodes present in the network, or a reminder frame including a transmission right node number for specifying a node having a transmission right and network live node map information, which is information on the nodes present in the network, the transmission device is configured to transmit a data frame, and after the transmission of the data frame, transmit a completion frame including a transmission node number for specifying a node of a transmission source and network live node map information, which is information on the nodes present in the network.

8 Claims, 9 Drawing Sheets

(56) References Cited

FOREIGN PATENT DOCUMENTS

JP      2016-96397  A    5/2016
JP      2016-178463 A    10/2016

* cited by examiner

TRANSMISSION DEVICE

CROSS-REFERENCE TO RELATED APPLICATIONS

This application is national stage application of International Application No. PCT/JP2020/011288, filed Mar. 13, 2020, which designates the United States, incorporated herein by reference, and which claims the benefit of priority from Japanese Application No. 2019-048781, filed on Mar. 15, 2019, the entire contents of each of which are incorporated herein by reference.

FIELD

Embodiments described herein relate generally to a transmission device.

BACKGROUND

Conventionally, control in a predetermined cycle is required in plants etc. that use an information control LAN (industrial network) that connects controllers etc., and a high-speed control cycle is required in iron and steel plants.

As one communication protocol used for a system for performing control in a predetermined high-speed control cycle as described above, a transmission protocol has been known for managing a transmission right for each node, such as an implicit token-passing method to specify transmission nodes for circulation.

Among implicit token-passing transmission protocols, there is a transmission protocol for setting a particular synchronization node, transmitting a synchronization frame for giving notice of a start timing of implicit token-passing, and transmitting a completion frame for giving notice of the shift of a transmission right in order to shift the transmission right to another node.

DETAILED DESCRIPTION

According to an embodiment, a transmission device has a current transmission right as a node constituting an implicit token-passing network. When receiving a synchronization frame including a synchronization node number for specifying a synchronization node and network five node map information, which is information on nodes present in the network, or a reminder frame including a transmission right node number for specifying a node having a transmission right and network live node map information, which is information on the nodes present in the network, the transmission device is configured to transmit a data frame, and after the transmission of the data frame, transmit a completion frame including a transmission node number for specifying a node of a transmission source and network live node map information, which is information on the nodes present the network.

Next, preferred embodiments are described with reference to the drawings.

First, the principle in an embodiment is described.

All nodes including a synchronization node that are participating in a network perform timeout detection of a time from when a completion frame CF for giving notice of the shift of a transmission right transmitted from a node that had the previous transmission right is received to when a completion frame CF of a node having the current transmission right is received.

Examples of the case where timeout is detected include a case where the reception of a completion frame CF or a synchronization frame that gives notice of a start timing of implicit token-passing has failed due to transient abnormality.

Thus, when a completion frame CF is not delivered from a node having the current transmission right and the timeout of the completion frame reception is detected, a node having the next transmission right acquires a transmission right.

In the present embodiment, in the case where a completion frame CF cannot be received after a given period of time has elapsed before the timeout, a reminder frame is transmitted once from the synchronization node to a node having the current transmission right in the network.

The node having the current transmission right that has received the reminder frame immediately transmits a data frame, and transmits a completion frame CF to which an identifier indicating that the reminder frame has been received and information on nodes having the remaining transmission rights that have not acquired a transmission right yet are added, so that the transmission right is shifted to a node that should have a transmission right next.

The remaining nodes that have not received the reminder frame and the synchronization node perform the timeout detection of the completion frame CF again.

In the case where a plurality of nodes have failed to receive a synchronization frame at the same time, a reminder frame is not transmitted each time a node that has failed to receive a synchronization frame acquires a transmission right, but when a completion frame CF distributed from a node that had a transmission right at the time when a reminder frame was received is received, the transmission right is updated by information on nodes having the remaining transmission rights that is added with the completion frame CF.

As a result, even when a completion frame CF is not delivered from a node having the current transmission right, the transmission of the completion frame CF is requested to a node having a transmission right at that time before the timeout is detected. Accordingly, the transmission of the completion frame CF can be prompted, and implicit token-passing can be continued while minimizing the effect on the control cycle due to transient abnormality.

Consequently, in the implicit token-passing, communication in a given period in a control network can be implemented.

[1] First Embodiment

Figure 1:
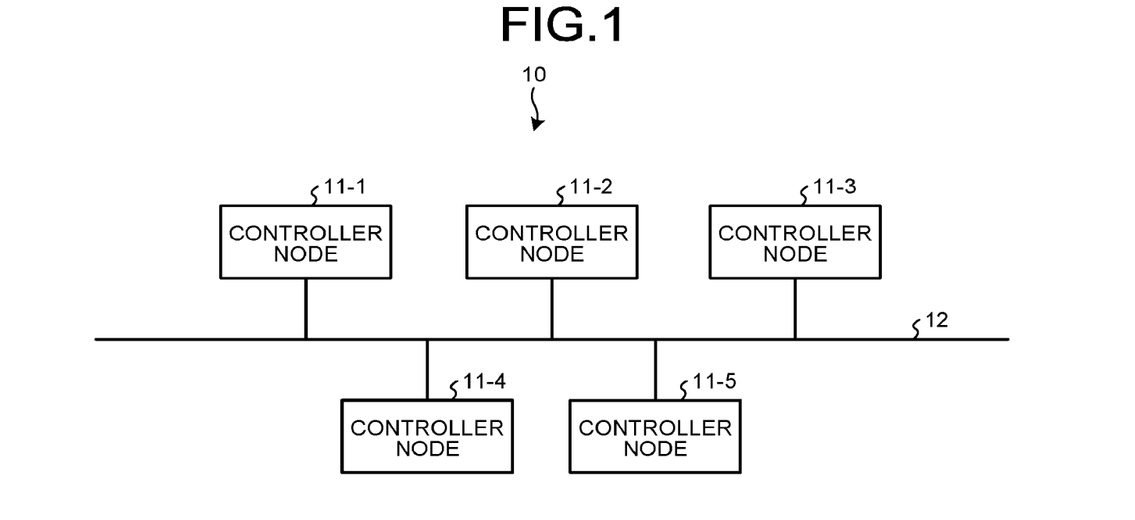
FIG. 1 is a schematic configuration block diagram of a control communication network in an embodiment.

FIG. 1 is a schematic configuration block diagram of a control communication network in an embodiment.

A control communication network 10 includes a controlled device (not shown), a plurality of (five in FIG. 1) controller nodes 11-1 to 11-5 to which sensors are connected, and a control LAN 12 that connects the controller nodes 11-1 to 11-5 in a communicable manner.

In the above-mentioned configuration, any one of the controller nodes 11-1 to 11-5 functions as a synchronization node (synchronization controller node). The synchronization node serves to manage a control period by transmitting a synchronization frame SF described later that defines a transmission cycle at the first of each control cycle.

Figure 2:
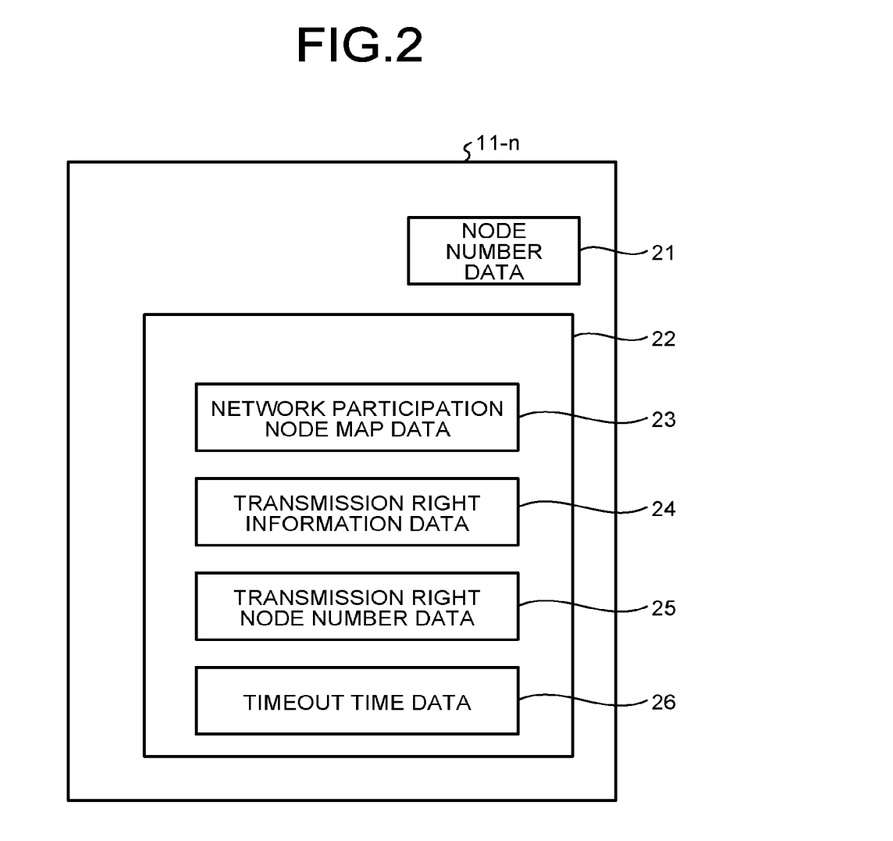
FIG. 2 is a main configuration explanatory diagram of a controller node.

FIG. 2 is a main configuration explanatory diagram of the controller node.

In each of the controller nodes 11-n (n: 1 to 5), separately from an IP address and a MAC address, a node number (node number data) 21 uniquely determined in the control communication network 10 is set in advance.

Next, a frame format in the embodiment is described.

Figure 3:
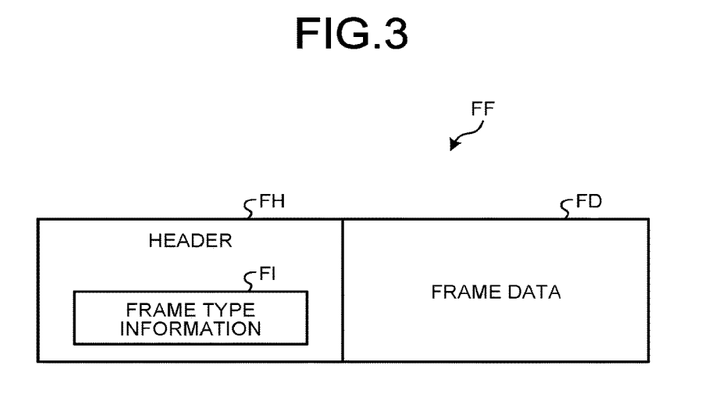
FIG. 3 is a diagram for explaining a common format of various kinds of frames used in the embodiment.

FIG. 3 is a diagram for explaining a common format of various kinds of frames used in the embodiment.

A frame FF includes a frame header FH and frame data FD.

The frame header FH includes frame type information FI indicating the type of frame, such as a synchronization frame, a completion frame, and a reminder frame described later, in addition to other kinds of header information (not shown) such as a transmission source IP address and one or a plurality of transmission destination IP addresses.

The frame data FD includes various kinds of data corresponding to the frame type information FI. Thus, the length of the frame data FD is different depending on the type of frame.

Next, the schematic operation in the first embodiment is described.

The controller node 11-n uses the node number 21 to perform a network control function for controlling the participation and withdrawal in and from the control communication network 10, control of the order of transmission in the control communication network 10, and cyclic transmission starting from the synchronization node.

The controller node 11-n has a memory 22. The memory 22 stores therein network participation node map data 23 indicating all controller nodes participating in the control communication network 10, transmission right information data 24 on the entire control communication network 10, transmission right node number data 25 on a controller node currently having a transmission right, and timeout time data 26 in which a timeout time for completion frame reception is stored.

The controller node 11-X that functions as a synchronization controller node transmits a synchronization frame SF, which defines a transmission period, at the head of each transmission period.

Figure 4:
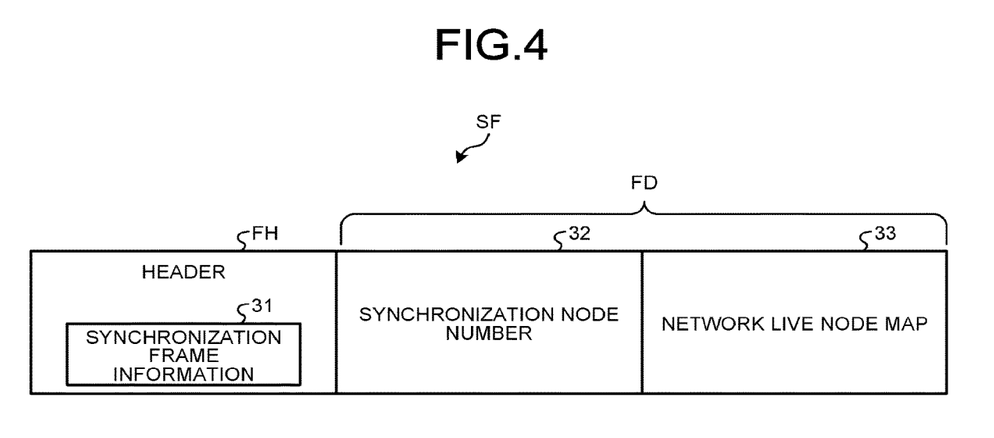
FIG. 4 is an explanatory diagram of an example of a data format of a synchronization frame.

FIG. 4 is an explanatory diagram of an example of the data format of the synchronization frame.

The synchronization frame SF includes synchronization frame information data 31 that functions as frame type information FI indicating that the frame is a synchronization frame SF, synchronization node number data 32 in which a synchronization node number is stored, and network live node map data 33 indicating all controller nodes that are recognized to be present (alive) in the control communication network 10 at the time when the synchronization frame is transmitted.

In this manner, each controller node that has received the synchronization frame SF starts implicit token-passing based on the received synchronization frame SF.

A controller node having a transmission right transmits a data frame DF.

After the transmission of the data frame DF, the controller node having the transmission right transmits a completion frame CF in order to notify other controller nodes that its own transmission right has completed.

Figure 5:
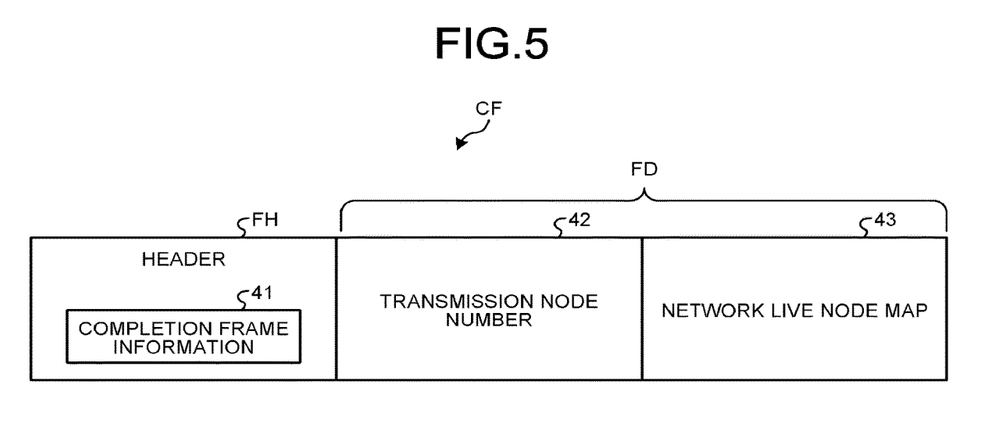
FIG. 5 is an explanatory diagram of a first example of a data format of a completion frame CF.

FIG. 5 is an explanatory diagram of a first example of the data format of the completion frame CF.

The completion frame CF in the first example includes completion frame information data 41 that functions as frame type information FI indicating that the frame is a completion frame CF, transmission node number data 42 in which node number data for specifying a controller node of a transmission source of the completion frame CF is stored, and network live node map data 43 indicating all controller nodes that are recognized to be present (alive) in the control communication network 10 at the time when the completion frame is transmitted.

In this manner, another controller node that has received the completion frame CF checks which of the controller nodes has the previous transmission right, and the transmission right is shifted to a controller node having the next transmission right.

The above-mentioned series of operation is performed until all controller nodes participating in the control communication network 10 acquire a transmission right and transmit a data frame. This period is set to one cycle.

The transmission right is shifted to a controller node that has the next transmission right in response to the transmission of a completion frame CF, but if the controller node that should have the next transmission right has failed to receive a completion frame CF due to transient abnormality, the transmission right cannot be shifted in such a case until a timeout time for completion frame reception elapses.

Thus, in the first embodiment, after the previous completion frame CF is received, when a predetermined time has elapsed from when a timer that detects the timeout time for the reception of the completion frame CF was started (for example, when a time corresponding to ½ of the timeout time for the reception of the completion frame CF has elapsed), a reminder frame RF is transmitted from the synchronization controller node to a controller node currently having a transmission right.

Figure 6:
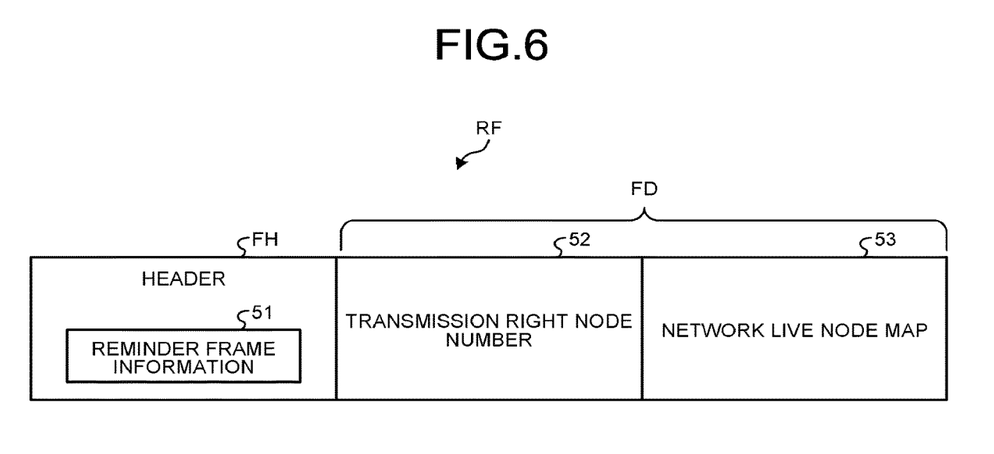
FIG. 6 is an explanatory diagram of an example of a data format of a reminder frame.

FIG. 6 is an explanatory diagram of an example of a data format of the reminder frame.

As illustrated in FIG. 6, a reminder frame RF includes reminder frame information data 51 that functions as frame type information FI indicating that the frame is a reminder frame RF, transmission right node number data 52 for specifying a controller node having a transmission right to which the reminder frame RF is to be transmitted, and network live node map data 53 indicating all controller nodes that have been confirmed to be present (alive) in the control communication network 10 at the time when the reminder frame RF is transmitted.

In the transmission right node number data 52 in the reminder frame RF, the node number of a controller node having the current transmission right is stored. A controller node that has received the reminder frame RF checks the node number of the controller node having the current transmission right.

When the controller node that has checked the node number is a controller node corresponding to the node number, the controller node transmits (re-transmits) a data frame, and transmits a completion frame CF after the transmission of the data frame.

Figure 7:
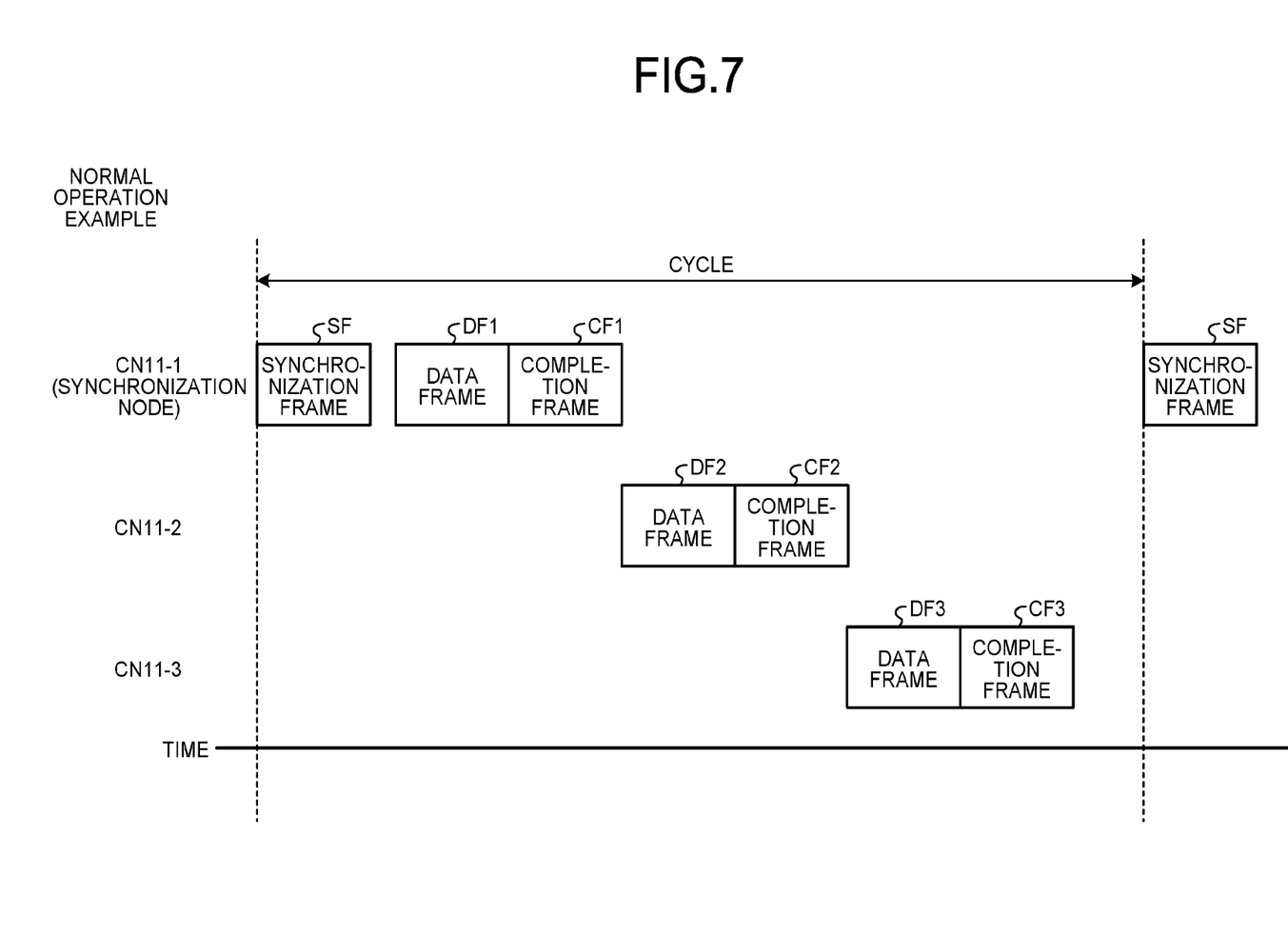
FIG. 7 is an operation explanatory diagram in a first embodiment.

FIG. 7 is an operation explanatory diagram in the first embodiment.

For easier understanding, FIG. 7 illustrates only the synchronization controller node 11-1 (denoted by CN11-1 in FIG. 7), the controller node 11-2 (denoted by CN11-2 in FIG. 7), and the controller node 11-3 (denoted by CN11-3 in FIG. 7), and the transmission right moves in the order of the controller node 11-1, the controller node 11-2, and the controller node 11-3.

As illustrated in FIG. 7, the controller node 11-1 as a synchronization node transmits synchronization frame data SF at the head of an operation cycle, and in synchronization with the transmission timing of the synchronization frame data, transmits a data frame DF1 and a completion frame CF1 indicating that the transmission of the data frame DF1 has completed.

In this manner, when the controller node 11-2 receives the completion frame CF1, the controller node 11-2 recognizes that the controller node 11-2 has the next transmission right, and transmits a data frame DF2 and a completion frame CF2 indicating that the transmission of the data frame DF2 has completed.

Furthermore, when the controller node 11-3 receives the completion frame CF2, the controller node 11-3 recognizes that the controller node 11-3 has the next transmission right, and transmits a data frame DF3 and a completion frame CF3 indicating that the transmission of the data frame DF3 has completed.

As a result, data is normally transmitted and received.

The controller node 11-1 as a synchronization node that has acquired a transmission right again transmits synchronization frame data SF at the head of an operation cycle, and the processing is thereafter similarly continued.

Figure 8:
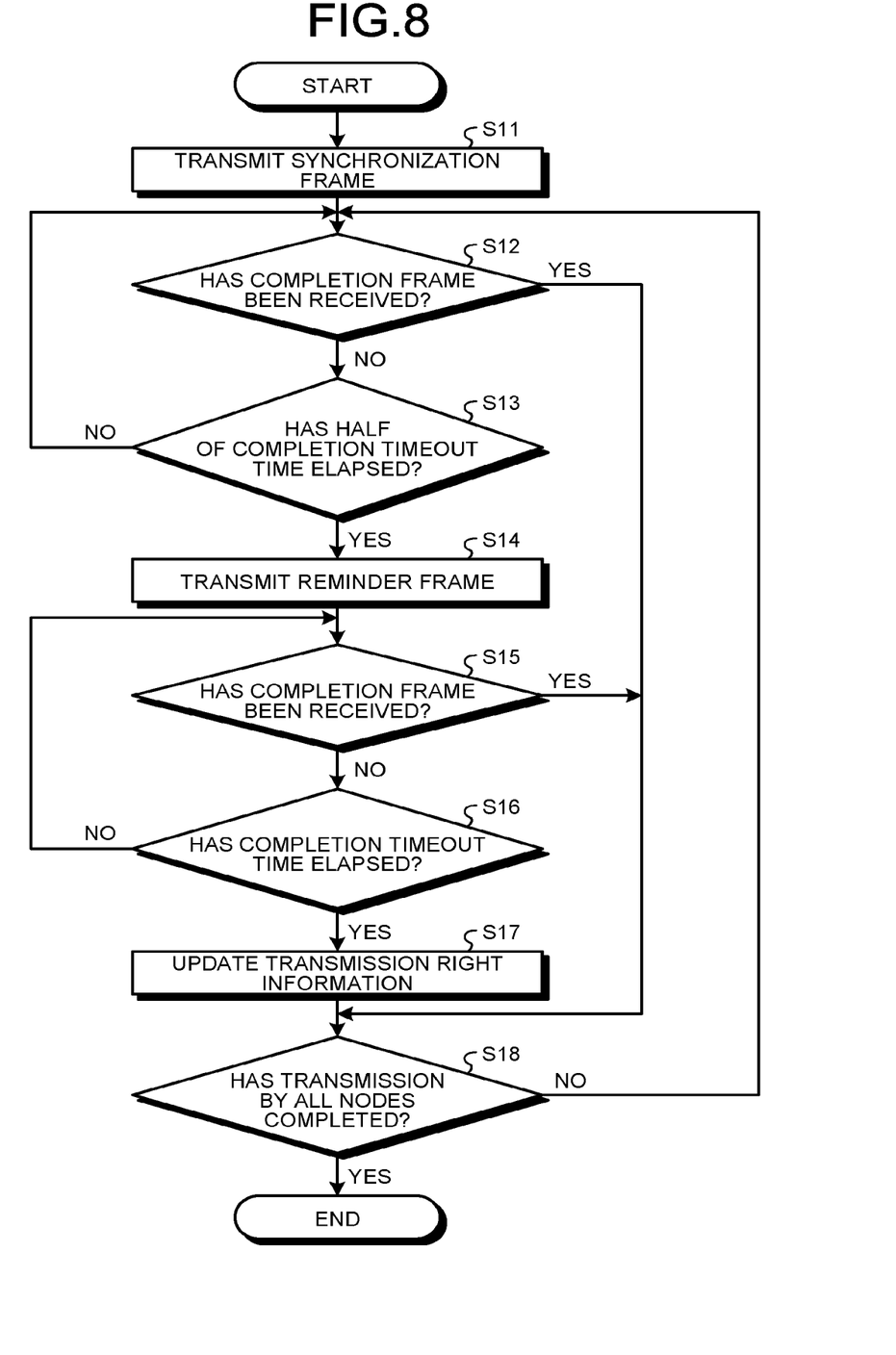
FIG. 8 is a flowchart of synchronization node processing in a controller node functioning as a synchronization node.

FIG. 8 is a processing flowchart of synchronization node processing in a controller node functioning as a synchronization node.

In the following, the case where a controller node functioning as a synchronization node is the controller node 11-1 is described as an example.

The controller node 11-1 functioning as a synchronization node transmits a synchronization frame SF (Step S11).

At the same time, the controller node 11-1 starts to count a completion timeout time, which is the maximum time for waiting for the transmission of a completion frame from a controller node that will have a transmission right next.

Next, the controller node 11-1 determines whether a completion frame has been received from a controller node currently having a transmission right (Step S12).

In the determination at Step S12, when the completion frame has been received (Yes at Step S12), the processing proceeds to Step S18 because the transmission processing of the controller node that currently has the transmission right has been completed.

In the determination at Step S12, when the completion frame has not been received yet (No at Step S12), the controller node 11-1 determines whether a predetermined time (in the example in FIG. 8, a half of completion timeout) in the completion timeout time has elapsed (Step S13).

In the determination at Step S13, when the predetermined time in the completion timeout time has not elapsed yet (No at Step S13), the processing proceeds to Step S12 again, and the controller node 11-1 becomes the standby state to wait for the reception of a completion frame.

In the determination at Step S13, when the predetermined time in the completion timeout time has elapsed (Yes at Step S13), the controller node 11-1 transmits, to a controller node currently having a transmission right, a reminder frame RF for requesting the transmission (including re-transmission) of a completion frame CF indicating the completion of transmission processing (Step S14).

The controller node 11-1 functioning as a synchronization node determines whether the completion frame CF has been received from the controller node having the transmission right (Step S15).

In the determination at Step S15, when the completion frame CF has been received, the processing proceeds to Step S18.

In the determination at Step S15, when the completion frame CF has not been received yet, the controller node 11-1 determines whether the completion timeout time has elapsed (Step S16).

In the determination at Step S16, when the completion timeout time has not elapsed yet (No at Step S16), the processing proceeds to Step S15 again, and the controller node 11-1 becomes the standby state to wait for the reception of a completion frame.

In the determination at Step S16, when the completion timeout time has elapsed (Yes at Step S16), the controller node 11-1 updates the transmission right information such that a controller node that should currently have a transmission right is changed to a controller node that should acquire a transmission right next (Step S17).

The controller node 11-1 determines whether the transmission processing of all controller nodes has completed or the transmission processing of all controller nodes can be regarded as having completed based on the updating of the transmission right information (Step S18).

In the determination at Step S18, when the transmission processing of all controller nodes has not completed yet or when the transmission processing of all controller nodes cannot be regarded as having completed based on the updating of the transmission right information (Step S18), the processing proceeds to Step S12 again, and the above-mentioned processing is repeated.

Next, a data frame transmission operation of the controller node is described.

Figure 9:
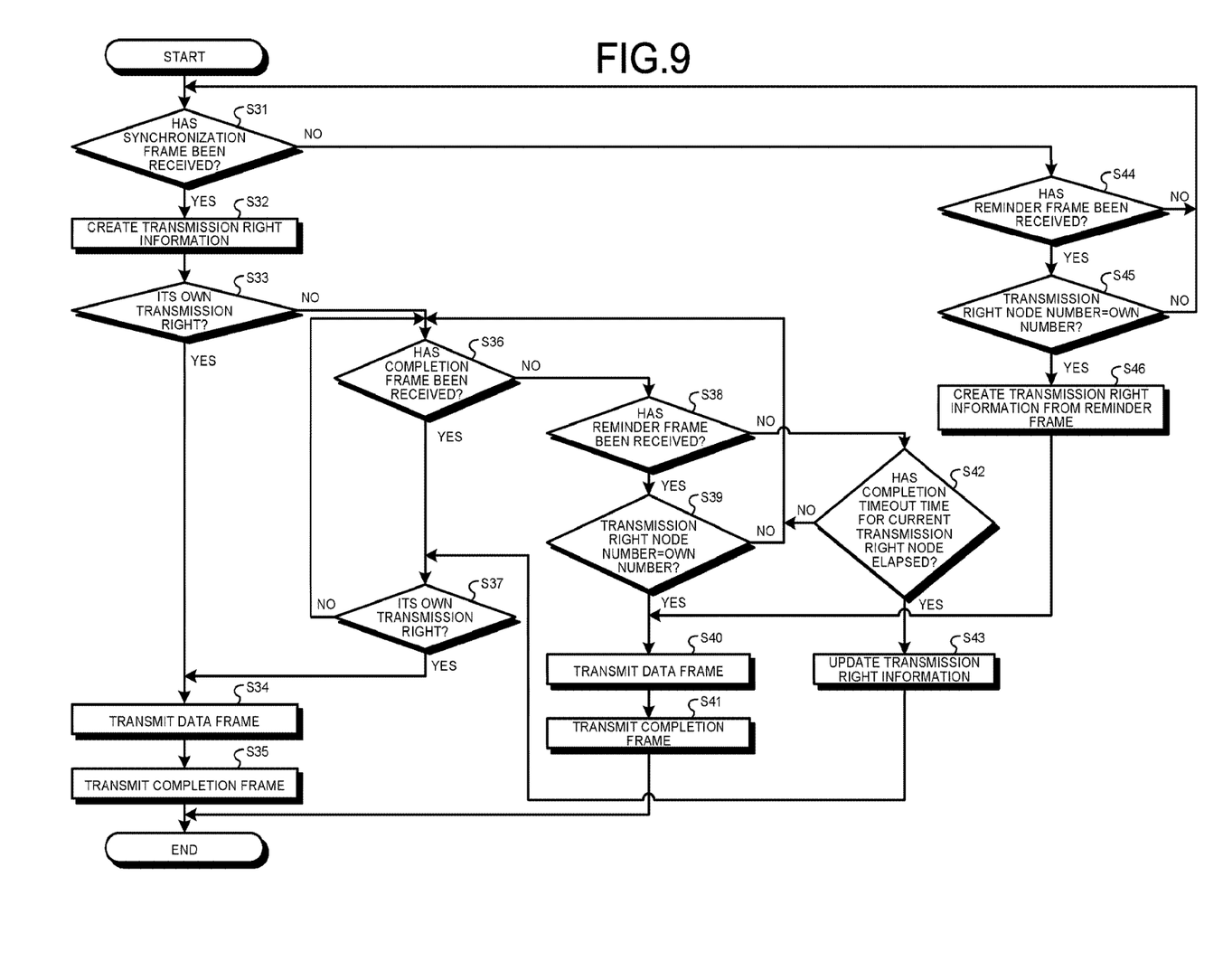
FIG. 9 is a diagram (No. 1) for explaining a data frame transmission operation in the controller node.

FIG. 9 is a diagram (No. 1) for explaining the data frame transmission operation of the controller node.

FIG. 9 illustrates the operation in which any controller node does not update transmission right information in response to the transmission of a data frame DF and a completion frame CF due to a reminder frame RF by a controller node having a transmission right that has received the reminder frame RF.

The controller node first determines whether a synchronization frame SF has been received from the synchronization controller node (Step S31).

In the determination at Step S31, when the synchronization frame SF has been received from the synchronization controller node (Yes at Step S31), the controller node creates transmission right information from the received synchronization frame SF (Step S32).

Subsequently, the controller node determines whether the created transmission right information is its own transmission right (Step S33).

In the determination at Step S33, when the created transmission right information is its own transmission right (Yes at Step S33), the controller node generates and transmits a data frame DF (Step S34).

Subsequently, after the transmission of the data frame DF has completed, the controller node generates and transmits a completion frame CF, and finishes the processing (Step S35).

In the determination at Step S33, when the created transmission right information is not its own transmission right (No at Step S33), the controller node determines whether a completion frame has been received from another controller node having a transmission right (Step S36). In other words, the controller node determines whether the other controller node having a transmission right has notified that the transmission of a data frame has completed.

In the determination at Step S36, when a completion frame has been received from another controller node having a transmission right (Yes at Step S36), the controller node determines, based on transmission node number data and network live node map data included in the received completion frame, whether a controller node that will acquire a transmission right next is the controller node in concern (Step S37).

In the determination at Step S37, when a controller node that will acquire a transmission right next is not the controller node in concern, the processing proceeds to Step S36, and the controller node becomes the standby state to receive a completion frame from another controller node that acquires a transmission right next.

In the determination at Step S37, when a controller node that will acquire a transmission right next is the controller node in concern (Yes at Step S37), the controller node generates and transmits a data frame (Step S34).

Subsequently, after the transmission of the data frame has completed, the controller node generates and transmits a completion frame, and finishes the processing (Step S35).

In the determination at Step S36, when a completion frame has not been received from another controller node having a transmission right yet (No at Step S36), the controller node determines whether a reminder frame transmitted by the synchronization controller node has been received due to the fact that the synchronization controller node has not received a completion frame from the controller node having the transmission right yet (Step S38).

In the determination at Step S38, when the reminder frame from the synchronization controller node has been received (Yes at Step S38), the controller node determines whether a transmission right node number included in the reminder frame is a transmission right node number corresponding to the controller node in concern (Step S39).

In the determination at Step S39, when the transmission right node number included in the reminder frame is not a transmission right node number corresponding to the controller node in concern (No at Step S39), the controller node considers a time to wait for the reception of a completion frame from a controller node that should have the current transmission right (=current transmission right node), and the processing proceeds to Step S36. Then, the above-mentioned processing is repeated.

In the determination at Step S39, when the transmission right node number included in the reminder frame is a transmission right node number corresponding to the controller node in concern (Yes at Step S39), the controller node determines that a controller node that should have acquired a transmission right next is the controller node in concern or determines that the completion frame CF has not been delivered, and generates and transmits a data frame DF (Step S40).

Subsequently, after the transmission of the data frame has completed, the controller node generates and transmits a completion frame, and finishes the processing (Step S41).

In the determination at Step S38, when the reminder frame from the synchronization controller node has not been received yet (No at Step S38), the controller node determines whether a completion timeout time, which is a time for waiting for reception of a completion frame from a controller node that should currently have a transmission right (=current transmission right node), has elapsed (Step S42).

In the determination at Step S42, when the completion timeout time has elapsed, the controller node determines that a timing to forcedly update the transmission right has come, and updates the transmission right information such that a transmission right is acquired by a controller node that should acquire a transmission right next based on the previously received synchronization frame (Step S43).

Subsequently, the controller node determines, based on the updated transmission right information, whether a controller node that will acquire a transmission right next is the controller node in concern (Step S37).

In the determination at Step S37, when a controller node that will acquire a transmission right next is not the controller node in concern, the processing proceeds to Step S36 again, and the controller node becomes the standby state to receive a completion frame from another controller node that acquires a transmission right next.

In the determination at Step S37, when a controller node that will acquire a transmission right next is the controller node in concern (Yes at Step S37), the controller node generates and transmits a data frame (Step S34).

In the determination at Step S42, when the completion timeout time has not elapsed yet (No at Step S42), the processing proceeds to Step S36 because of a time to wait for the reception of a completion frame from a controller node that should have the current transmission right (=current transmission right node). Then, the above-mentioned processing is repeated.

In the determination at Step S31, when a synchronization frame has not been received from the synchronization controller node yet (No at Step S31), there is a possibility that the controller node has failed to receive a synchronization frame, and hence the controller node determines whether a reminder frame transmitted by the synchronization controller node has been received (Step S44).

In the determination at Step S44, when the reminder frame from the synchronization controller node has been received (Yes at Step S44), the controller node determines whether a transmission right node number included in the reminder frame is a transmission right node number corresponding to the controller node in concern (Step S45).

In the determination at Step S45, when the transmission right node number included in the reminder frame is not a transmission right node number corresponding to the controller node in concern (No at Step S45), the controller node considers a time to wait for the reception of a synchronization frame from the synchronization controller node, and the processing proceeds to Step S31. Then, the above-mentioned processing is repeated.

In the determination at Step S45, when the transmission right node number included in the reminder frame is a transmission right node number corresponding to the controller node in concern (Yes at Step S45), the controller node determines that a controller node that should acquire a transmission right next is the controller node in concern, and creates transmission right information from the received reminder frame RF (Step S46).

The controller node generates and transmits a data frame DF (Step S40).

Subsequently, after the transmission of the data frame has completed, the controller node generates and transmits a completion frame, and finishes the processing (Step S41).

As described above, in the operation illustrated in FIG. 9, when the processing is performed in a manner that a controller node that is supposed to have acquired a transmission right is regarded as having not acquired a transmission right or when a completion frame CF has not been delivered, by receiving a reminder frame from a controller node functioning as a synchronization node, a data frame and a completion frame can be transmitted without waiting for the lapse of the completion timeout time, and hence implicit token-passing can be continued while suppressing the effect on the control cycle due to transient abnormality.

Next, another data frame transmission operation of the controller node is described.

Unlike the case of the operation in FIG. 9, the following description indicates an operation in which a controller node having a transmission right that has received a reminder frame RF updates transmission right information based on the transmission of a data frame DF and a completion frame CF in response to the reminder frame RF.

Figure 10:
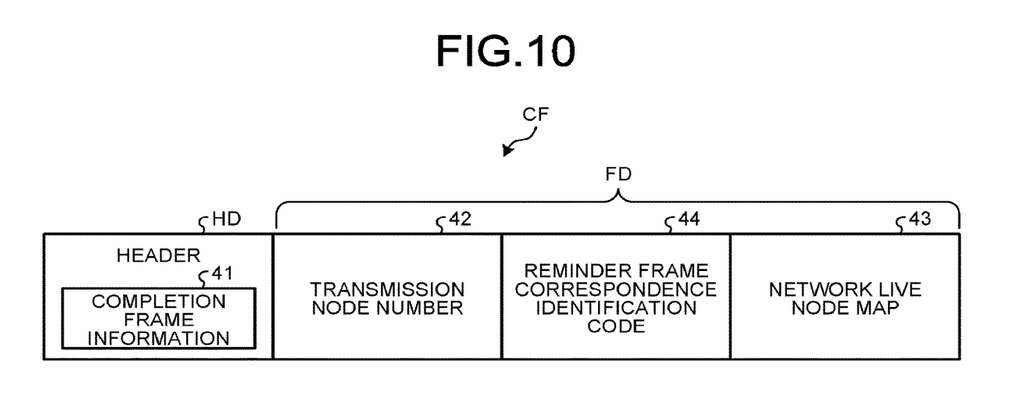
FIG. 10 is an explanatory diagram of a second example of the completion frame CF.

FIG. 10 is an explanatory diagram of a second example of the completion frame CF.

In FIG. 10, the same parts as in FIG. 5 are denoted by the same reference symbols.

The completion frame CF in the second example includes completion frame information data 41 that functions as frame type information FI indicating that the frame is a completion frame CF, transmission node number data 42 in which node number data for specifying a controller node of a transmission source of the completion frame CF is stored, reminder frame correspondence identification code data 44 for specifying a reminder frame to which the completion frame CF is to be transmitted, and network live node map data 43 indicating all controller nodes that are recognized to be present (alive) in the control communication network 10 at the time when the completion frame is transmitted.

Figure 11:
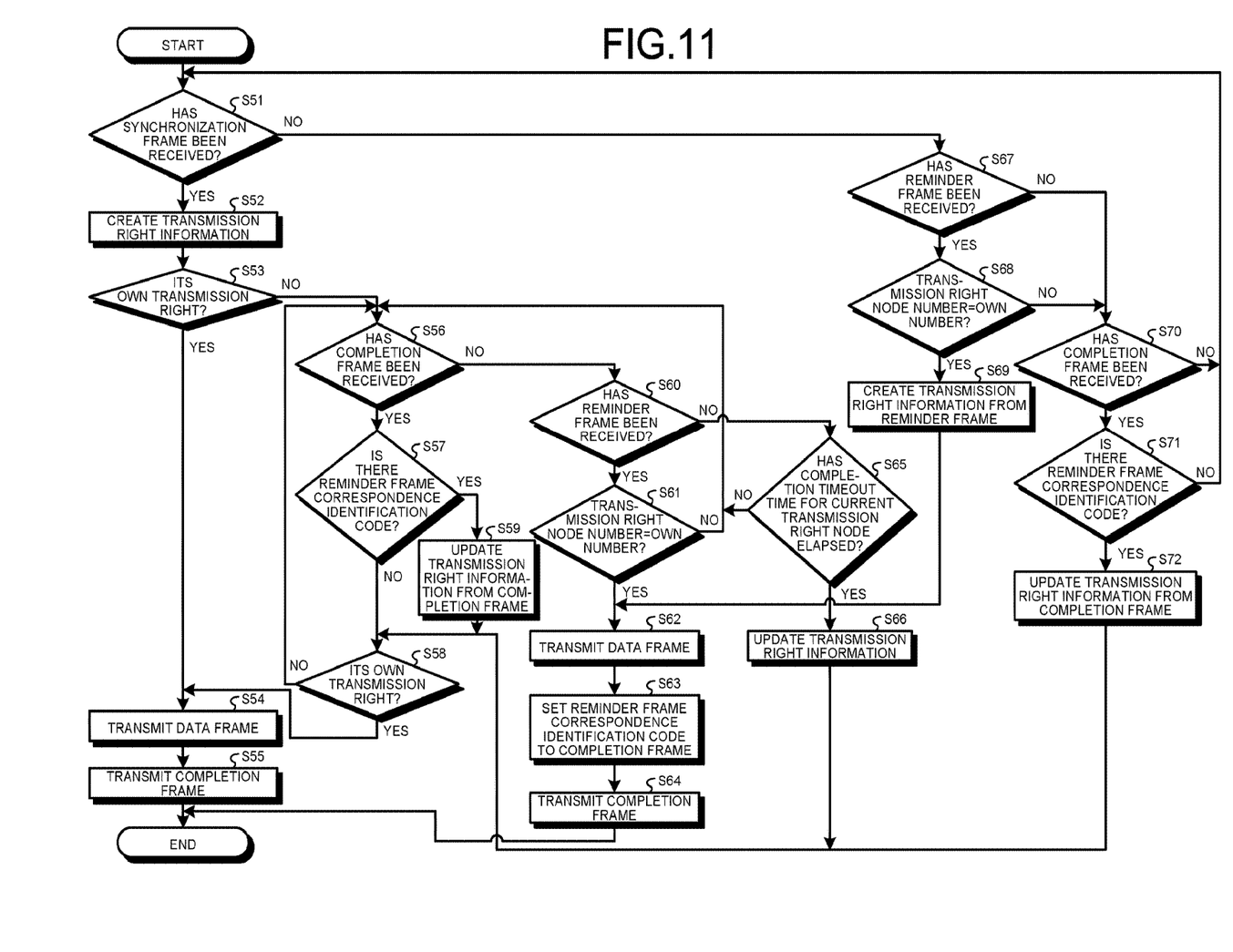
FIG. 11 is a diagram (No. 2) for explaining a data frame transmission operation in the controller node.

FIG. 11 is a diagram (No. 2) for explaining a data frame transmission operation of a controller node.

The controller node first determines whether a synchronization frame has been received from a synchronization controller node (Step S51).

In the determination at Step S51, when the synchronization frame has been received from the synchronization controller node (Yes at Step S51), the controller node creates transmission right information from the received synchronization frame (Step S52).

Subsequently, the controller node determines whether the created transmission right information is its own transmission right (Step S53).

In the determination at Step S53, when the created transmission right information is its own transmission right (Yes at Step S53), the controller node generates and transmits a data frame (Step S54).

Subsequently, after the transmission of the data frame has completed, the controller node generates and transmits a completion frame, and finishes the processing (Step S55).

In the determination at Step S53, when the created transmission right information is not its own transmission right (No at Step S53), the controller node determines whether a completion frame has been received from another controller node having a transmission right (Step S56). In other words, the controller node determines whether the other controller node having a transmission right has notified that the transmission of the data frame has completed.

In the determination at Step S56, when a completion frame has been received from another controller node having a transmission right (Yes at Step S56), the controller node determines whether reminder frame correspondence identification code data 44 is included in the received completion frame (Step S57).

In the determination at Step S57, when the reminder frame correspondence identification code data is not included in the received completion frame (No at Step S57), the processing proceeds to Step S58.

In the determination at Step S57, when the reminder frame correspondence identification code data is included in the received completion frame (Yes at Step S57), the controller node updates the transmission right information such that a transmission right is acquired by a controller node that should acquire a transmission right next based on the completion frame (Step S59).

Subsequently, the controller node determines, based on transmission node number data and network live node map data included in the completion frame, whether a controller node that will acquire a transmission right next is the controller node in concern (Step S58).

In the determination at Step S58, when a controller node that will acquire a transmission right next is not the controller node in concern, the processing proceeds to Step S56 again, and the controller node becomes the standby state to receive a completion frame from another controller node that acquires a transmission right next.

In the determination at Step S58, when a controller node that will acquire a transmission right next is the controller node in concern (Yes at Step S58), the controller node generates and transmits a data frame (Step S54).

Subsequently, after the transmission of the data frame has completed, the controller node generates and transmits a completion frame, and finishes the processing (Step S55).

In the determination at Step S56, when a completion frame has not been received yet from another controller node having a transmission right (No at Step S56), the controller node determines whether a reminder frame transmitted by the synchronization controller node has been received due to the fact that the synchronization controller node has not received a completion frame from the controller node having the transmission right yet (Step S60).

In the determination at Step S60, when the reminder frame from the synchronization controller node has been received (Yes at Step S60), the controller node determines whether a transmission right node number included in the reminder frame is a transmission right node number corresponding to the controller node in concern (Step S61).

In the determination at Step S61, when the transmission right node number included in the reminder frame is not a transmission right node number corresponding to the controller node in concern (No at Step S39), the controller node considers a time to wait for the reception of a completion frame from a controller node that should have the current transmission right (=current transmission right node), and the processing proceeds to Step S56 again. Then, the above-mentioned processing is repeated.

In the determination at Step S61, when the transmission right node number included in the reminder frame is a transmission right node number corresponding to the controller node in concern (Yes at Step S61), the controller node determines that a controller node that should acquire a transmission right next is the controller node in concern, and generates and transmits a data frame (Step S62).

The controller node generates a completion frame CF in which reminder frame correspondence identification code data corresponding to the received reminder frame RF is set (Step S63).

Subsequently, the controller node transmits the generated completion frame, and finishes the processing (Step S64).

In the determination at Step S60, when the reminder frame from the synchronization controller node has not been received yet (No at Step S60), the controller node determines whether a completion timeout time, which is a time for waiting for reception of a completion frame from a controller node that should currently have a transmission right (=current transmission right node), has elapsed (Step S65).

In the determination at Step S65, when the completion timeout time has elapsed (Yes at Step S65), the controller node determines that a timing to forcedly update the transmission right has come, and updates the transmission right information such that a transmission right is acquired by a controller node that should acquire a transmission right next based on the previously received synchronization frame SF (Step S66).

Subsequently, the controller node determines, based on the updated transmission right information, whether a controller node that will acquire a transmission right next is the controller node in concern (Step S58).

In the determination at Step S58, when a controller node that will acquire a transmission right next is not the controller node in concern, the processing proceeds to Step S56 again, and the controller node becomes the standby state to receive a completion frame from another controller node that acquires a transmission right next.

In the determination at Step S58, when a controller node that will acquire a transmission right next is the controller node in concern (Yes at Step S58), the controller node generates and transmits a data frame (Step S54).

In the determination at Step S65, when the completion timeout time has not elapsed yet (No at Step S65), the processing proceeds to Step S56 again because of a time to wait for the reception of a completion frame from a controller node that should have the current transmission right (=current transmission right node). Then, the above-mentioned processing is repeated.

In the determination at Step S51, when a synchronization frame has not been received from the synchronization controller node yet (No at Step S51), there is a possibility that the controller node has failed to receive a synchronization frame, and hence the controller node determines whether a reminder frame transmitted by the synchronization controller node has been received (Step S67).

In the determination at Step S67, when the reminder frame from the synchronization controller node has been received (Yes at Step S67), the controller node determines whether a transmission right node number included in the reminder frame is a transmission right node number corresponding to the controller node (Step S68).

In the determination at Step S68, when the transmission right node number included in the reminder frame is a transmission right node number corresponding to the controller node (Yes at Step S68), the controller node creates transmission right information from the received reminder frame (Step S69), and the processing proceeds to Step S62. After that, the same processing as described above is repeated.

When the reminder frame RF from the synchronization controller node has not been received yet (No at Step S67) in the determination at Step S67 or when the transmission right node number included in the reminder frame is not a transmission right node number corresponding to the controller node (No at Step S68) in the determination at Step S68, the controller node determines whether a completion frame has been received from another controller node having a transmission right (Step S70).

In the determination at Step S70, when a completion frame has been received from another controller node having a transmission right (Yes at Step S70), the controller node determines whether reminder frame correspondence identification code data is included in the received completion frame (Step S71).

In the determination at Step S71, when reminder frame correspondence identification code data is not included in the received completion frame CF (No at Step S57), the processing proceeds to Step S51.

In the determination at Step S71, when correspondence identification code data is included in the received completion frame CF (Yes at Step S71), the controller node updates the transmission right information such that a transmission right is acquired by a controller node that should acquire a transmission right next based on the completion frame CF (Step S72), and the processing proceeds to Step S58 again. After that, the same processing as the above-mentioned processing is repeated.

As described above, also in the operation illustrated in FIG. 11, when the processing is performed in a manner that a controller node that is supposed to have acquired a transmission right is regarded as having not acquired a transmission right or when a completion frame CF has not been delivered, by receiving a reminder frame from a controller node functioning as a synchronization node, a data frame and a completion frame can be transmitted without waiting for the lapse of the completion timeout time, and hence implicit token-passing can be continued while suppressing the effect on the control cycle due to transient abnormality.

Furthermore, as compared with the operation illustrated in FIG. 9, the completion frame CF includes reminder frame correspondence identification code data capable of identifying that the frame is a completion frame CF corresponding to the corresponding reminder frame RF, and hence the transmission right information can be reliably updated in response to the reception of the completion frame, and higher reliability can be secured.

[2] Second Embodiment

The above-mentioned first embodiment deals with the non-completion of the shift of the transmission right due to the fact that any controller node has failed to receive a completion frame CF and the effect on the control cycle. A second embodiment has the purpose of reducing frames being not transmittable and data missing due to the failure of reception of a synchronization frame from the synchronization controller node.

The case where a controller node in a network has failed to receive a synchronization frame SF from the synchronization controller node is considered.

In this case, the controller node that has failed to receive a synchronization frame SF cannot start implicit token-passing itself, and cannot transmit a data frame DF and a completion frame CF in this period.

In the case where one controller node in the network has failed to receive a synchronization frame SF, similarly to the first embodiment, by receiving a reminder frame RF from the synchronization controller node, the controller node can acquire a transmission right and participate in the circulation of the transmission right.

Next, the case where a plurality of controller nodes in a network have failed to receive a synchronization frame SF is considered.

Figure 12:
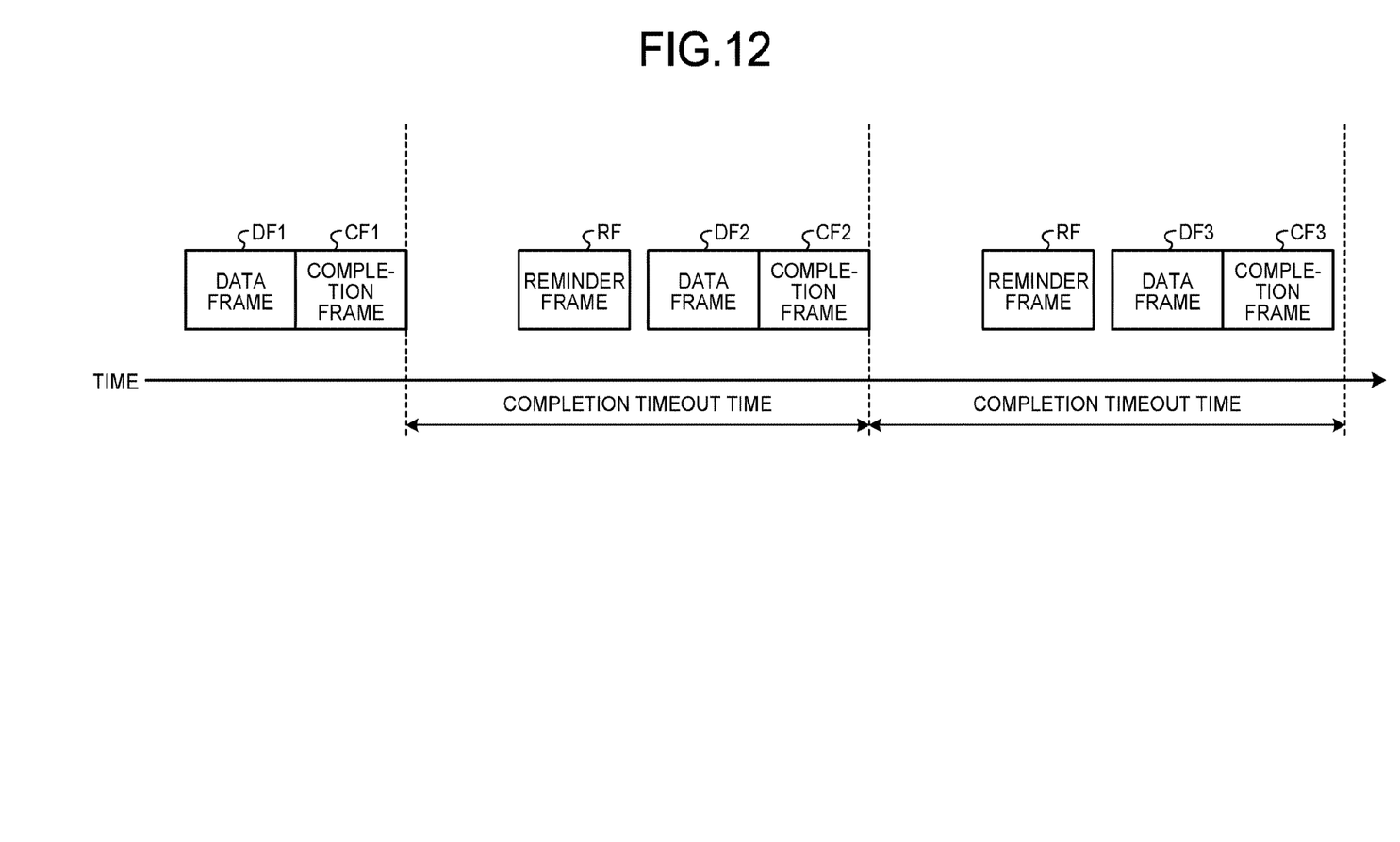
FIG. 12 is an explanatory diagram when a plurality of controller nodes have failed to receive a synchronization frame.

FIG. 12 is an explanatory diagram when the controller nodes have failed to receive a synchronization frame.

FIG. 12 illustrates an example in which the controller node 11-2 and the controller node 11-3 have failed to receive a synchronization frame.

In this case, the controller node 11-2 has failed to receive a synchronization frame SF, and hence does not recognize that the controller node 11-2 is participating in implicit token-passing. Thus, the controller node 11-2 does not transmit a data frame DF until a reminder frame RF is received from the synchronization controller node after the completion frame of the controller node 11-1 has been received.

The controller node 11-3 has also failed to receive a synchronization frame SF, and hence does not recognize that the controller node 11-3 is participating in implicit token-passing. Thus, the controller node 11-3 does not transmit a data frame DF until a reminder frame RF is received from the synchronization controller node after the completion frame of the controller node 11-2 has been received.

Thus, in the method in the above-mentioned first embodiment, when a plurality of nodes that have failed to receive a synchronization frame are present in the same cycle in a network, tokens can be circulated by a reminder frame, but as a result, it may take a time equal to or more than a completion timeout time, and the effect on a control cycle cannot be suppressed.

In view of the above, in the second embodiment, when a controller node that has received a reminder frame RF (in the above-mentioned example, the controller nodes 11-2 and 11-3) sets the reminder frame correspondence identification code data 44 included in a completion frame CF, and further copies its own transmission right information on nodes in the network to transmission right node information 45 in the completion frame CF, and then transmits the completion frame CF.

On the other hand, each controller node that has received the completion frame CF checks the reminder frame correspondence identification code data 44, and when the reminder frame correspondence identification code data 44 is "1", copies the transmission right node information 45 in the completion frame CF to the network participation node map data 23 included in its own memory 22. In this manner, a controller node in which the network participation node map data 23 has not been updated, that is, a controller node which has failed to receive a synchronization frame SF and in which its own network participation node map data 23 has not been updated can update its own network participation node map data 23 at this timing, and become ready to acquire a transmission right.

In this manner, the controller node can be set to the state similar to the state in which the synchronization frame SF has been received, and hence the controller node can start data transmission at a time when a completion frame CF of a controller node having a transmission right prior to the controller node in concern is received.

Consequently, after receiving the completion frame CF of the controller node 11-2, the controller node 11-3 can transmit a data frame DF without waiting for the reception of the reminder frame RF.

In this manner, even when nodes have failed to receive a synchronization frame SF, simply by transmitting a reminder frame RF to one controller node from the synchronization controller node, data missing in a cycle can be prevented and the effect on a control cycle can be minimized.

The transmission device in the present embodiment includes a control device such as a CPU, a storage device such as a read only memory (ROM) and a RAM, an external storage device such as an HDD and a CD drive device, a display device such as a display, and various kinds of input devices, and has a hardware configuration using a general computer.

Computer programs executed by the transmission device in the present embodiment are recorded and provided in a computer-readable recording medium such as a CD-ROM, a USB memory, a memory card, a semiconductor memory device such as a solid state drive (SSD), and a digital versatile disc (DVD) as a file in an installable format or an executable format.

The computer programs executed by the transmission device in the present embodiment may be stored on a computer connected to a network such as the Internet, and provided by being downloaded through the network. The computer programs executed by the transmission device in the present embodiment may be provided or distributed through a network such as the Internet.

The computer programs executed by the transmission device in the present embodiment may be provided by being incorporated in a ROM in advance.

While some embodiments of the present invention have been described, the embodiments are illustrative and not intended to limit the scope of the invention. The novel embodiments can be implemented in other various forms, and can be variously omitted, replaced, and changed within the range not departing from the gist of the invention. The embodiments and modifications thereof are included in the scope and gist of the invention, and included in the scope of the invention described in the claims and its equivalence.

The invention claimed is:

1. A transmission device having a current transmission right as a node constituting an implicit token-passing network,
when receiving a synchronization frame including a synchronization node number for specifying a synchronization node and network live node map information, which is information on nodes present in the network, or a reminder frame including a transmission right node number for specifying a node having a transmission right and network live node map information, which is information on the nodes present in the network,
the transmission device being configured to transmit a data frame, and after the transmission of the data frame, transmit a completion frame including a transmission node number for specifying a node of a transmission source and network live node map information, which is information on the nodes present in the network.

2. The transmission device according to claim 1, wherein, when receiving the reminder frame, the transmission device creates transmission right information based on the reminder frame, and determines whether the transmission device itself has acquired the transmission right.

3. The transmission device according to claim 1, wherein the completion frame further includes reminder frame identification code data for identifying the received reminder frame.

4. The transmission device according to claim 3, wherein, when receiving the completion frame including the reminder frame identification code data, the transmission device updates network live node map information held in the transmission device itself with the network live node map information included in the completion frame.

5. The transmission device according to claim 1, wherein, when the transmission device further functions as a synchronization node, the transmission device transmits the synchronization frame for each predetermined cycle.

6. The transmission device according to claim 5, wherein, when a predetermined time has elapsed from previous transmission of the synchronization frame and when the completion frame from another transmission device having a current transmission right has not been received, the transmission device transmits the reminder frame.

7. The transmission device according to claim 6, wherein the predetermined time until the reminder frame is transmitted is set to be shorter than a predetermined completion timeout time, which is a maximum time for waiting for reception of the completion frame from the previous transmission of the synchronization frame.

8. The transmission device according to claim 7, wherein the predetermined time until the reminder frame is transmitted is set to a time of a half of the completion timeout time.

* * * * *